(12) United States Patent
Finkelstein (10) Patent No.: US 9,967,237 B2
(45) Date of Patent: May 8, 2018

(54) SYSTEMS AND METHODS FOR IMPLEMENTING A LAYER TWO TUNNEL FOR PERSONALIZED SERVICE FUNCTIONS

(71) Applicant: COX COMMUNICATIONS, INC., Atlanta, GA (US)

(72) Inventor: Jeffrey L. Finkelstein, Atlanta, GA (US)

(73) Assignee: COX COMMUNICATIONS, INC., Atlanta, GA (US)

( * ) Notice: Subject to any disclaimer, the term of this patent is extended or adjusted under 35 U.S.C. 154(b) by 211 days.

(21) Appl. No.: 14/856,690

(22) Filed: Sep. 17, 2015

(65) Prior Publication Data
US 2017/0085529 A1    Mar. 23, 2017

(51) Int. Cl.
*G06F 3/00* (2006.01)
*H04L 29/06* (2006.01)
*H04L 12/741* (2013.01)

(52) U.S. Cl.
CPC .......... *H04L 63/029* (2013.01); *H04L 45/745* (2013.01); *H04L 63/101* (2013.01); *H04L 63/162* (2013.01)

(58) Field of Classification Search
CPC ... H04L 45/745; H04L 63/029; H04L 63/101; H04L 63/162
See application file for complete search history.

(56) References Cited

U.S. PATENT DOCUMENTS

| | | | | |
|---|---|---|---|---|
| 6,427,170 B1 * | 7/2002 | Sitaraman | ......... | H04L 29/12066 709/226 |
| 6,985,935 B1 * | 1/2006 | Zhang | ................. | H04L 12/2856 370/401 |
| 8,588,742 B2 * | 11/2013 | Oswal | .................. | H04W 12/06 370/395.52 |
| 2008/0313691 A1 * | 12/2008 | Cholas | ............... | H04N 21/4147 725/131 |
| 2011/0154440 A1 * | 6/2011 | De Graaf | ............ | H04L 61/2015 726/3 |
| 2012/0204241 A1 * | 8/2012 | Varsavsky Waisman-Diamond | | H04L 29/12367 726/5 |
| 2013/0227670 A1 * | 8/2013 | Ahmad | ............... | H04L 41/5054 726/11 |
| 2013/0304880 A1 * | 11/2013 | Lin | ..................... | H04L 41/0803 709/220 |

* cited by examiner

*Primary Examiner* — Sayed Beheshti Shirazi
(74) *Attorney, Agent, or Firm* — Eversheds Sutherland (US) LLP (57) ABSTRACT

A Layer Two Tunnel may be established between one or more user devices and a tunnel aggregator device via a home gateway. By establishing the Layer Two Tunnel, the tunnel aggregator and other entities of an access network, such as a multi-system operator (MSO) network, may be configured to identify individual user devices at a customer premise. As a result, the network operator may be able to offer individual user device and user based services. Additionally, operations, such as DHCP, NAT, etc., that may otherwise be conducted at a customer premise, such as by a home gateway, may be performed at the MSO and/or in the cloud.

17 Claims, 5 Drawing Sheets

SYSTEMS AND METHODS FOR IMPLEMENTING A LAYER TWO TUNNEL FOR PERSONALIZED SERVICE FUNCTIONS

BACKGROUND

Existing networks at customer premise locations may include a home gateway, or a similar device, that manages communication with various user devices at the customer premise location. For example, the home gateway device may interface with devices on external networks, such as the Internet, to send and receive information on behalf of the user devices using a single Transmission Control Protocol/Internet Protocol (TCP/IP) address assigned to the home gateway. Such a configuration unfortunately makes it difficult for devices on networks external to identify user devices at the customer premise location, which limits the ability to provide various features and services to the user devices, among other unfortunate circumstances.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers refer to like elements throughout.

DETAILED DESCRIPTION

Certain embodiments herein relate to, among other things, implementing a personal cloud experience for users. One example implementation may relate to extending the customer premise into a cloud computing arrangement. The implementation may relate to extending information associated with user devices at a customer premise into the cloud using Layer Two tunneling. A home gateway at the customer premise may establish a Layer Two tunnel across a Layer Three network to a server in the cloud, or otherwise on the Layer Three network. The server may use the Layer Two tunnel to obtain particular information about each device at the customer premise, such as a MAC address, an IP address (which, in some example embodiments, the cloud-based server may establish), as well as other device-specific information.

In example embodiments, a cloud-based server, such as a tunnel aggregator (TAG) or virtual client premise equipment (VCPE) may have visibility into and/or control over locally unique addresses (LUAs) of a variety of user devices at a customer premise. In example embodiments, a home gateway device may be configured to serve as a node for the establishment of the Layer Two tunnel between user devices at a customer premise and the TAG. In some cases, the home gateway device may be configured to operate as a pass-through device to enable communications between the user devices at a customer premise and the TAG. Accordingly, in these example embodiments, the home gateway device may facilitate communications between user devices and the TAG at an Open Systems Interconnection (OSI) Model two layer (e.g., media access control (MAC) layer, data link layer, etc.). In this way, the TAG may know the LUA of each of the user devices at a customer premise by having access to layer two information (e.g., MAC address) of each of the user devices. Therefore, the home gateway may facilitate a layer two tunnel such that the communications from and/or to each of the user devices may be encapsulated in layer two (e.g., with an identifiable MAC address for each user device) visible to the TAG.

Since the TAG may be a component of a service network (e.g., multi-operator system (MSO)), services based on identity of user(s) and/or user device(s) at the customer premise may now be enabled, since the TAG, by having access to layer two addressing/routing information of each of the user devices, may be configured to provide user device specific services. It will be appreciated that the layer two traffic communicated via the Layer Two tunnel may, in example embodiments, be carried by higher OSI layer(s). However, the layer two information may be available to the TAG, even if the Layer Two tunnel is enabled by higher OSI levels (e.g., IP layer). Example device specific and/or user specific services may include device or user specific virus protection, device or user specific adult content filters, device or user specific child usage filters, device or user specific digital rights management (DRM), user device resource dependent content delivery, or the like.

In the example embodiments, as described herein, where individual LUA are known at the TAG, it will be appreciated that a more efficient allocation of globally unique addresses (GUA) may be allocated. Instead of allocating a different GUA to each home gateway at each of the customer premise, a single GUA may be used across any suitable number of user devices (e.g., each user device with its own LUA), even user devices from various customer premises. The systems, apparatus, and methods, according to example embodiments, as described herein, may be relatively efficient in associating LUAs with GUAs. In other words, instead of allocating a relatively smaller number of LUAs to a GUA (e.g., user devices in a household associated with a unique home gateway address), a relatively larger number of LUAs, corresponding to individual user devices, may be allocated to a particular GUA.

Further example embodiments may relate to administration and location of cloud-based services (e.g., servers of a service network that provides particular services). According to example embodiments, a network of cloud-based services may be dynamically generated for a customer. In so doing, the location of the cloud-based services may be determined, shared with a home gateway device at the customer premise, and used to direct requests from customer devices to a particular location, for example, a particular instance on a particular server in the cloud that offers the requested service(s) from that user device. As new instances are created, customers may be directed to these new instances based on the location of the newly created instances.

Example embodiments may still further relate to dynamic creation and relocation of cloud-based services. Dynamic routing policies may be generated via a service function chain (SFC) in the cloud. In other words, according to example embodiments, static routing policies outside of the cloud may not be used. The SFC chain may route users to certain services in the cloud, based on user requests, by manipulating headers in the packets, in one example. As services are moved to different cloud locations, the SFC may dynamically update its policy to ensure routing of information (e.g., user requests) to the new cloud locations.

Another implementation may relate to heuristics used in cloud service relocation. Various metrics and techniques to determine whether to locate cloud services may be implemented. In one embodiment, service level agreements may be used to make such determinations.

The above descriptions of example implementations are for purposes of illustration and are not meant to be limiting. Although each of these implementations is described in greater detail below, such descriptions are also not meant to be limiting. Other descriptions, examples, etc., may also exist.

I. Extending the Customer Premise into the Cloud

Figure 1:
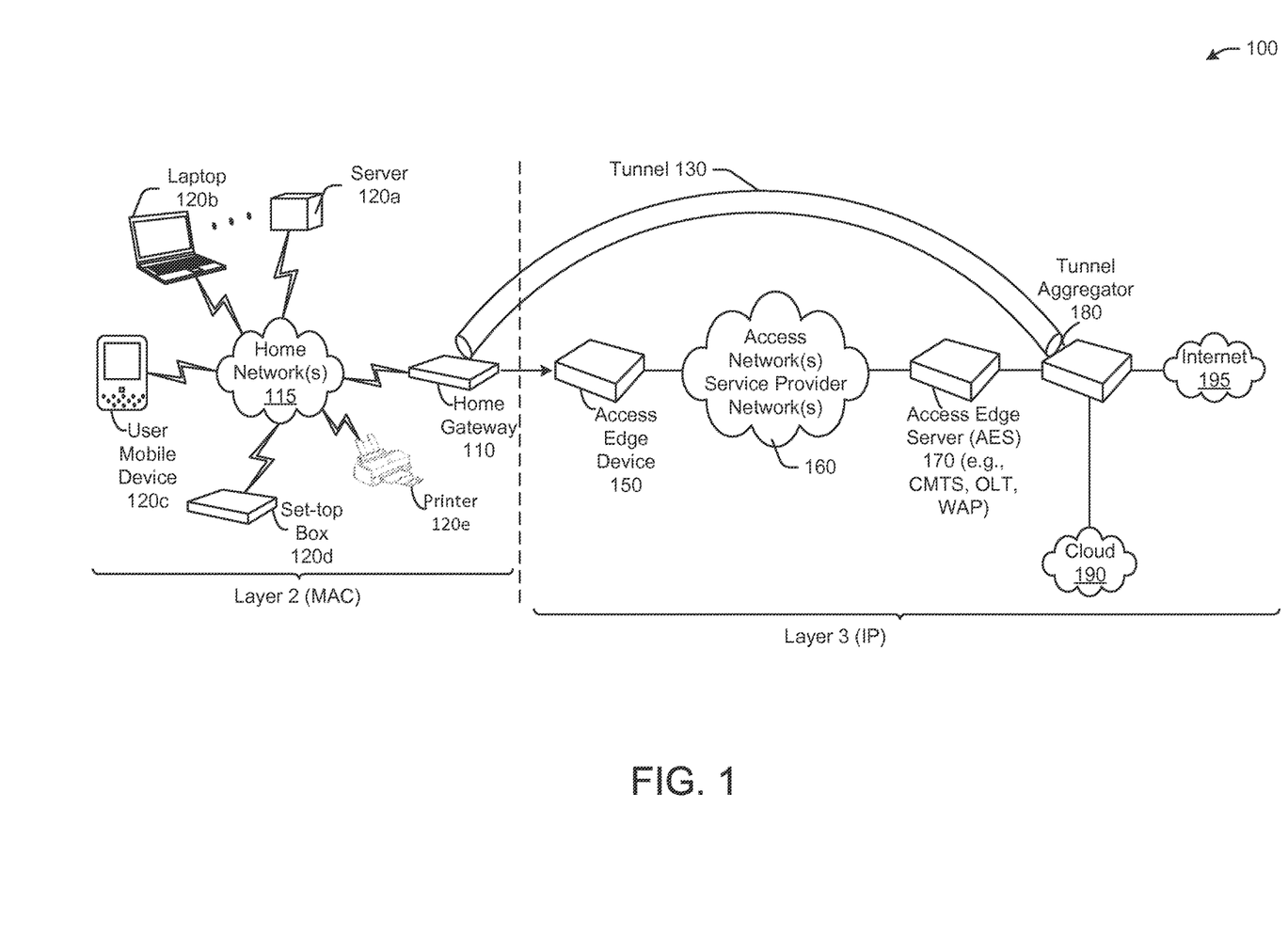
FIG. 1 illustrates an example network that includes devices configured to implement a personal cloud experience for users, according to an embodiment of the disclosure.

As described above, Layer Two functionality at a customer premise may be extended into a cloud computing arrangement, or more generally referred to herein as the cloud. FIG. 1 depicts an example architecture 100 that includes devices configured to enable such an extension. As shown, the architecture 100 may include, but is not limited to, a home gateway 110 and various user devices 120ae located at a customer premise location. Although a certain number and type of devices are shown at the customer premise location, a different number and/or type of these devices may exist at the customer premises. The devices at the customer premise location may be referred to as Layer Two devices, which may utilize the Media Access Control (MAC) protocol to communicate with each other over one or more home networks 115.

The example architecture 100 may also include various devices in Layer Three. Such devices may communicate with each other using the TCP/IP protocol. The devices in Layer Three devices may include, but are not limited to, an access edge device 150, an access edge server 170, and a tunnel aggregator 180. The access edge device 150 may communicate with the access edge server 170 over an access network or service provider network 160. The tunnel aggregator 180 may communicate with the access edge server 170, as well as with the cloud 190, which may include one or more devices configured to provide various services to users located at customer premise locations. It will be appreciated that in some example embodiments, the home gateway 110 and the access edge device 150 may be an integrated single device.

In certain embodiments herein, the home gateway 100 may establish a Layer Two tunnel to the tunnel aggregator (TAG) 180. Various protocols may be used to establish the Layer Two tunnel, such as Layer Two Tunneling Protocol (L2TP), Soft-Generic Routing Encapsulation (soft-GRE), Virtual Local Area Network (VLAN), etc. After establishment of the Layer Two tunnel with the tunnel aggregator 180, the tunnel aggregator 180 may perform network functions that may no longer be performed by the home gateway 110 to communicate with the devices 120a-e. For example, in some example embodiments, the tunnel aggregator 180 may perform Dynamic Host Configuration Protocol (DHCP), Domain Name Service (DNS), Network Address Translation (NAT), firewall, Authentication, Authorization, and Accounting (AAA), and/or other services instead of such services being performed by the home gateway 110. In other example embodiments, the TAG 180 may operate in conjunction with a virtual client premise equipment (VCPE) to provide DHCP, DNS, NAT, AAA, and/or firewall. In one example, the tunnel aggregator 180 and/or a VCPE may be configured to assign IP addresses to each devices 120a-e using DHCP, and therefore, may identify, send, receive, and track communications to and from the devices 120a-e. It will be appreciated that this functionality may be enabled by the TAG 180 having access to the Layer 2 identities (e.g., MAC addresses) of the user devices 120a-e. Prior systems may have leveraged a single IP address (e.g., that of the home gateway 110), which may represent the user devices 120a-e on the Internet 195, the cloud 190, or other publicly-accessible network. As described above, such a configuration may make it difficult for network devices outside of the customer premise location to identify and communicate with the user devices 120a-e. According to example embodiments of the disclosure, since layer two addresses of individual devices are available to the TAG 180, the TAG 180 may be configured to offer the functions that may otherwise be performed by the home gateway without having the layer two tunnel 130. In some ways, this may offload processing bandwidth needs from the home gateway device 110 and to the TAG 180 and/or cloud 190.

The tunnel aggregator 180 may facilitate access to services in the cloud 190. Example services may include IP video, firewall services, storage, security services, service function chaining (SFC), etc. The tunnel aggregator 180 may receive a request for such services from the user devices 120a-e, identify the user device 120a-e, and authenticate access to the services requested by the user devices 120a-e, among other functions. For example, a user device 120b that requested access to an IP television service may be authenticated to determine whether the user device 120b has permission to access the IP television service. The tunnel aggregator 180 may, by knowing the identity of each of the user devices 120a-e, determine that the device 120c, for example, may not have access to the IP television service. The tunnel aggregator 180 may also authenticate access by certain users utilizing the devices 120a-e. In another non-limiting example, adult content filters (e.g., filters that may disallow pornographic or violent content) may be established on certain user devices 120a-e (e.g., a user device that a child may use). When content is requested on a user device with such adult content filters, the TAG 180 or other entities within the access network 160 may be configured to determine if the requested content is in compliance with the established adult content filters on that particular user device 120a-e. At the same time, other user devices 120a-e in the same household may not have the same types of adult content filtering. Those devices 120a-e may indeed be able to access adult content. This type of functionality and service may be enabled by the TAG 180 having identifying information of the user device 120 a-d that may be making the request for the content. Such services may not be possible if from the TAG 180 standpoint, individual user devices 120a-e were not separately visible, such as if only the home gateway 110 had individual user device 120a-e LUA (e.g., MAC address) information.

In one embodiment, the tunnel aggregator 180 and/or an associated VCPE may perform identification of the user devices 120*a-e* by analyzing a tuple associated with data packets received from such devices. The tuple may include an identification (e.g., a unique name, IP address, etc.,) of a device that sends information, such as a request for a service in the cloud 190, as well as an identification (e.g., a unique name, IP address, etc.,) of a source device in the cloud 190 that provides all or at least a portion of the requested server, in some implementations. In other example embodiments, the TAG 180 and/or an associated VCPE may identify the user devices 120*a-e* via user authentication.

In one embodiment, a user of the user devices 120*a-e* may access the tunnel aggregator device 180 to configure access to services, among other things. The tunnel aggregator device 180 may have an IP address of 192.168.1.1, or other known administration network address, that may be accessed by a user to configure the tunnel aggregator device 180.

The access edge device 150 may include various devices that may enable the home gateway 110 to access the service provider network 160. Example devices may include, but are not limited to, a cable modem, an optical network terminator (ONT), Ethernet end point, and/or an access point (AP) (e.g., an LTE AP, a WiFi AP, etc.).

The service provider network 160 may include various transport mediums that may distribute information between the customer premise and the cloud 190. Example transport mediums may include coaxial cable, optical fiber, a hybrid network that includes coaxial cable and optical fiber, devices that enable wireless transmissions, Ethernet, etc.

The access edge server 170 may include devices such as, but not limited to, a cable modem termination system (CMTS), an optical line terminator (OLT), a wireless access point (WAP), Ethernet switch, etc.

The cloud computing arrangement 190 may include one or more groups of servers and software networks that may allow access to computer services, resources, data, storage, and various other services such as, but not limited to, those described above.

As used herein, the term "device" may refer to any computing component that includes one or more processors that can be configured to execute computer-readable, computer-implemented, or computer-executable instructions. Example devices may include, but are not limited to, customer premise equipment, set-top boxes, cable modems, digital tablets, digital assistants, personal digital assistants, smart phones, personal computers, server farms, Internet appliances, smart cards, wearable devices, application-specific circuits, microcontrollers, minicomputers, transceivers, kiosks, or other processor-based devices. The execution of suitable computer-implemented instructions by one or more processors associated with various devices may form special purpose computers or other particular machines that may implement or facilitate a personal cloud experience for users as described herein.

The one or more networks 160 may facilitate communication between the devices in FIG. 1. Such networks may include any number of wired and/or wireless networks that may enable various computing devices in the example system 100 to communicate with one another. Example networks may include, but are not limited to, cable networks, MSOs, Internet, intranets, other landline-based networks, cellular networks, radio networks, satellite networks, WiFi networks, WiFi Direct networks, and Near Field Communication (NFC) networks.

The above descriptions in FIG. 1 are for purposes of illustration and are not meant to be limiting. Other descriptions, examples, embodiments, etc., may exist in other examples.

Figure 2:
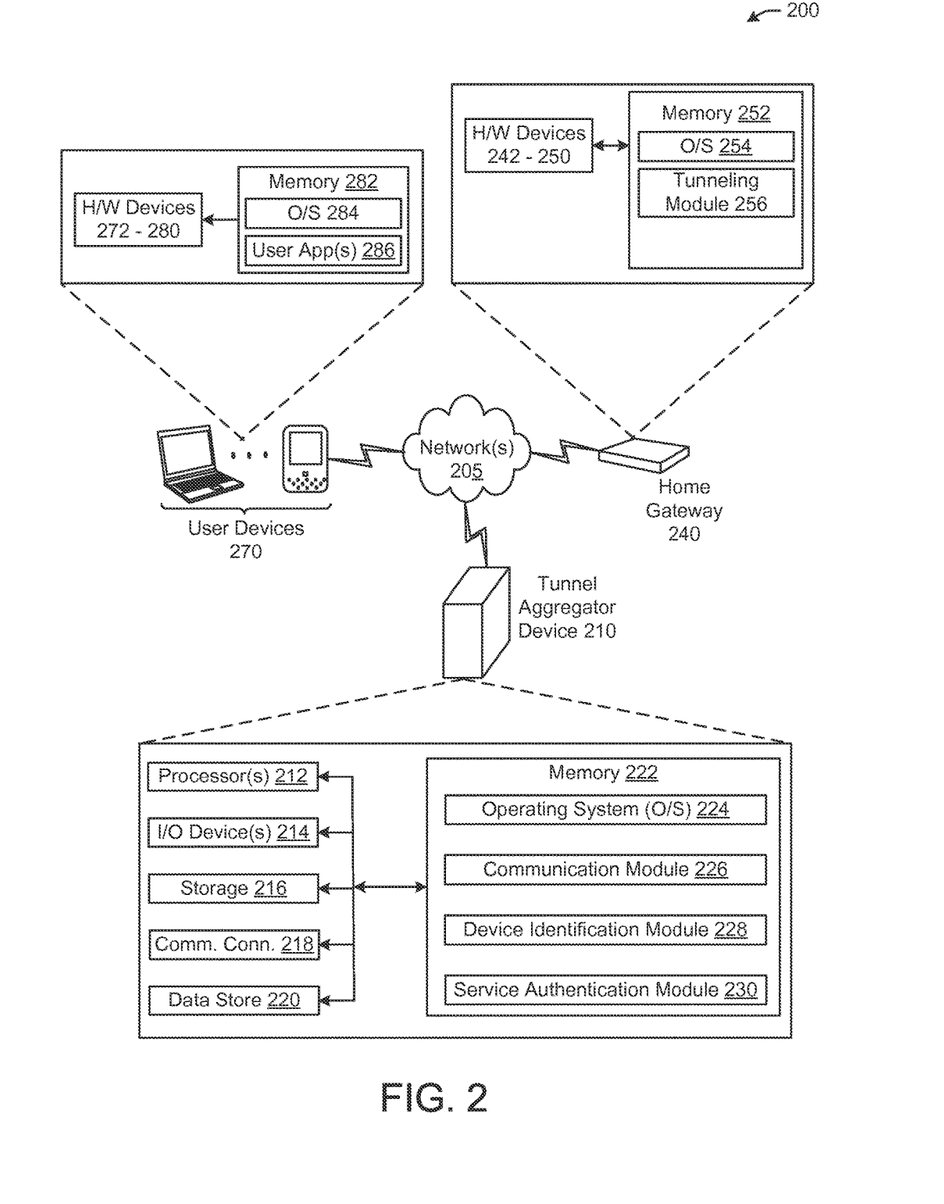
FIG. 2 illustrates an example computing environment for implementing a personal cloud experience for users, according to an embodiment of the disclosure.

FIG. 2 depicts an example computing environment 200 for implementing a personal cloud experience for users, according to an embodiment of the disclosure. The example computing environment 200 may include, but is not limited to, a tunnel aggregator 210, a home gateway 240, and user devices 270. Although a certain number of these devices is shown in FIG. 2, any number of these devices may exist in other embodiments. As described above in association with FIG. 1, the devices in FIG. 2 may communicate with each other over one or more networks 205. For example, the user device 270 may communicate with the home gateway 240 over a home network 205, which may embody the home network 115 in FIG. 1. The tunnel aggregator 210 may communicate with the home gateway over a service provider network 205, which may embody the service provider network 150 in FIG. 1. In other words, the Layer Two Tunnel, as described above, between the TAG device 210 and the user devices 270, may be enabled by the infrastructure of the network(s) 205.

The devices in FIG. 2 may include one or more processors configured to communicate with one or more memory devices and various other components or devices. For example, the tunnel aggregator device 210 may include one or more processors 212 that are configured to communicate with one or more memory or memory devices 222, one or more input/output (I/O) devices 214, storage 216, one or more communication connections 218, and one or more data stores 220. The processor 212 may be implemented as appropriate in hardware, software, firmware, or a combination thereof. The processors 242 and 272 associated with the home gateway 240 and the user device 270, respectively, may be the same or at least similar to the processor 212.

The memory 222 of the tunnel aggregator device 210 may store program instructions that are loadable and executable on the processor 212, as well as data generated during the execution of these programs. Depending on the configuration and type of tunnel aggregator device 210, the memory 222 may be volatile, such as random access memory (RAM), and/or non-volatile, such as read-only memory (ROM), flash memory, etc. The memory 252 and 272 associated with the home gateway device 240 and the user device 270, respectively, may be the same or at least similar to the memory 222.

The storage 216 of the tunnel aggregator device 210 may include removable and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. The storage 246 and 276 associated with the home gateway 240 and the user device 270, respectively, may be the same or at least similar to the storage 216.

The memory 222 and the storage 216, both removable and non-removable, are all examples of computer-readable storage media. For example, computer-readable storage media may include volatile and non-volatile, removable and non-removable media implemented in any method or technology for storage of information such as computer-readable instructions, data structures, program modules, or other data. In some implementations, the memory 222 may include multiple different types of memory, such as static random access memory (SRAM), dynamic random access memory (DRAM), or ROM.

The one or more communication connections 218 may allow the tunnel aggregator device 210 to communicate with other devices, such as the home gateway 240, one or more user devices 270, and various devices in a cloud computing arrangement, which may reside in the one or more networks 205 or the cloud 190 in FIG. 1, as examples. In one embodiment, the communication connections 248 and 278 associated with the home gateway 240 and the user device 270, respectively, may be the same or at least similar to the communication connections 218.

The I/O devices 214 may enable a user to interact with the tunnel aggregator device 210. Such I/O devices 214 may include, but are not limited to, a keyboard, a mouse, a pen, a voice input device, a touch input device, a gesture capture or detection device, a display, a camera or imaging device, speakers, or a printer. The I/O devices 244 and 274 associated with the home gateway 240 and the user device 270, respectively, may be the same or at least similar to the I/O devices 214.

The data stores 220 may store lists, arrays, databases, flat files, etc. In some implementations, the data stores 220 may be stored in memory external to the tunnel aggregator device 210 but may be accessible via the one or more networks 205, such as with a cloud storage service. The data stores 220 may store information that may facilitate dynamic utilization of advertising capabilities by an application on a user device, as described herein. In some embodiments, all or at least a portion of such information may be stored in the data stores 220, while at least another portion of the information may be stored in one or more databases or other storage mechanisms, whether local or remote from the tunnel aggregator device 210.

Turning to the contents of the memory 222, the memory 222 may include an operating system 224 and various software applications and/or modules that may implement or facilitate the processes described herein. Example modules may include, but are not limited to, a communication module 226, a device identification module 228, and a service authentication module 230. Each of these modules may be implemented as individual modules that provide specific functionality associated with the processes implemented or facilitate herein by the tunnel aggregator device 210. Alternatively, one or more of the modules may perform all or at least some of the functionality associated with the other modules.

The operating system 224 may refer to a collection of software that manages computer hardware resources and provides common services for computer programs to enable and facilitate operation of such programs. Example operating systems may include Android, other mobile device operating systems, UNIX, Microsoft Windows, Apple OS X, Mac OS, Linux, Solaris, etc. The operating systems 254 and 284 associated with the home gateway 240 and the user device 270 may include at least one of the above example operating systems.

The communication module 226 may configure the tunnel aggregator device 210 to communicate with the other devices shown in FIG. 2, as described above. For example, the communication module 226 may receive requests to establish a Layer Two tunnel from the home gateway 240. The processor(s) 212 may be configured to communicate with the home gateway to establish the Layer Two Tunnel, such as by using a variety of handshaking protocols and/or communications protocols. After the tunnel is established, the communication module 226 may also receive information from the user devices 270, among other devices, to facilitate the process described herein. Examples of such information are described in greater detail below. The communication module 226 may also send information to the user devices 270 and the home gateway 240, devices in the cloud (e.g., the cloud 190 in FIG. 1), as well as other devices on the one or more networks 205.

The communication module 226 may implement various communication protocols to enable communication with the devices in FIG. 2. Example protocols may include Layer Two Tunneling Protocol (L2TP), Soft-GRE, and VLAN to facilitate establishing a tunnel with the home gateway 240 or other device; and various communication protocols that enable the tunnel aggregator 210 to send and/or receive information, such as Hypertext Transfer Protocol (HTTP), Transmission Control Protocol/Internet Protocol (TCP/IP), socket-based protocols such as the WebSocket protocol, or other message formats and/or rules for exchanging information between computing devices to support communication between web-based program code and client-server-based program code, as examples. Additional protocols may include Simple Mail Transfer Protocol (SMTP) or other electronic mail formats for transmitting messages via electronic mail or text messaging using one or more text formats. The other devices in FIG. 2 may also include the same or a similar communication module 226.

The device identification module 228 may identify the user device 270 at the customer premise location. Such identification may include determining a network address (e.g., an IP address) for the user device 270, for example, using DHCP, and assigning the determined network address to the user device 270. Subsequently, the device identification module 270 may associate network traffic received from the user device 270 with the assigned IP address. The network traffic may include identifying information for the user device 270, requests for services, content, data, or other information sent by the user device 270, etc.

The service authentication module 230 may authenticate access to services in the cloud by the user device 270. By knowing which user device 270 has requested a service, the service authentication module 230 may determine whether the user device and/or a user of the user device 270 may access the service. The service authentication module 230 may consider certain factors in authenticating the user device 270 and/or the user. Example factors may include parameters associated with the user device 270, such as purchase history of a requested service, parental controls associated with a requested service, time of day the service is requested, login/password, etc.

The memory 252 of the home gateway 240 may include a tunneling module 256. The tunneling module 256 may establish a Layer Two tunnel with the tunnel aggregator device 210, in one embodiment. As described above, various protocols that may be used to establish the tunnel may include Layer Two Tunneling Protocol (L2TP), Soft-GRE, and VLAN, among others.

The memory 282 of the user device 270 may include one or more user applications 286. The one or more user applications 286 may configure the user device 270 to send, receive, interact with, etc., various content, such as video, audio, data, multimedia, text, and other information.

Figure 3:
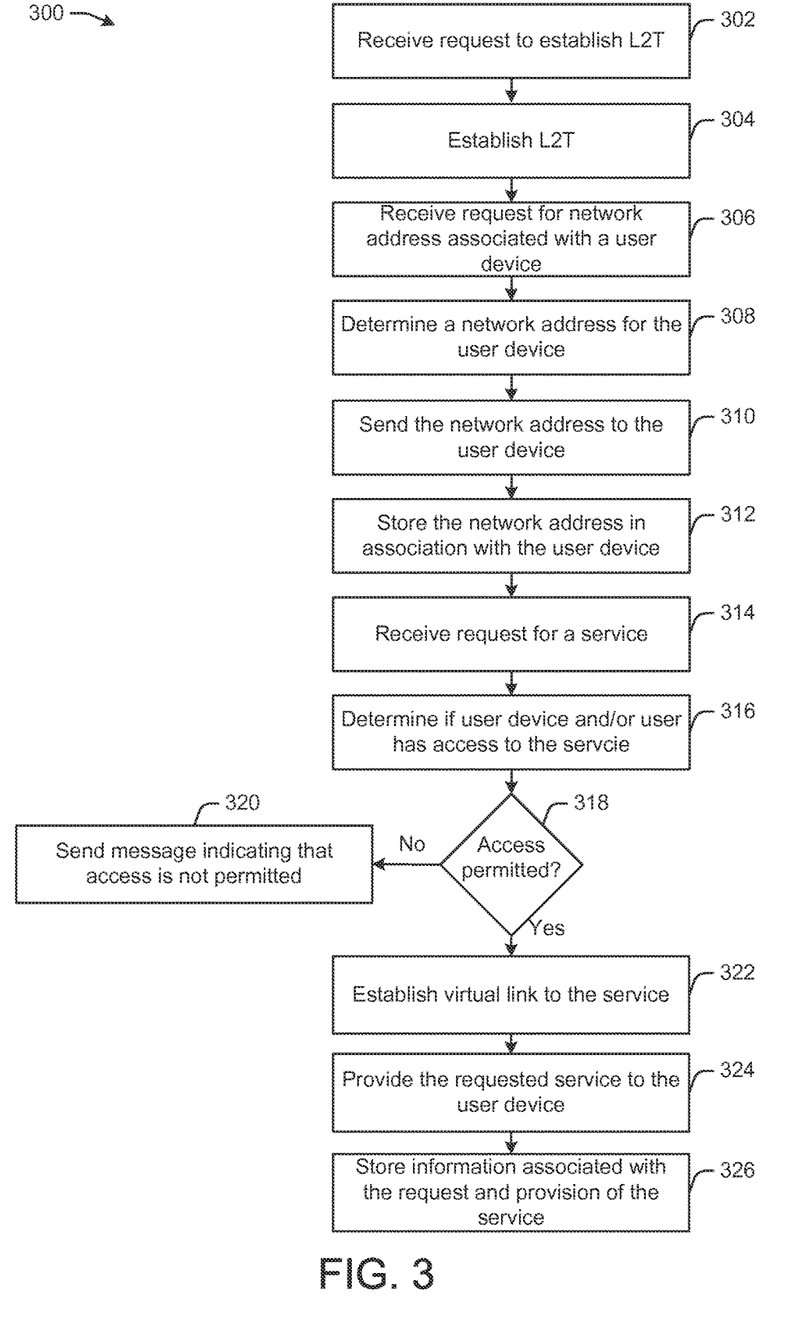
FIG. 3 illustrates a flow diagram of an example method for extending a customer premise into the cloud by use of a level two tunnel, according to an embodiment of the disclosure.

FIG. 3 depicts a flow diagram of an example process 300 extending a customer premise into the cloud, according to an embodiment of the disclosure. The example process 300 may be implemented by a tunnel aggregator device, such as the tunnel aggregator device 210 in FIG. 2. The example process 300 may begin at block 302, where a request to establish a Layer Two tunnel may be received (e.g., by the communication module 226). The request may be received from a home gateway, such as the home gateway 240 in FIG. 2.

A Layer Two tunnel may be established (e.g., via the communication module 226) at block 304. For example, the tunnel aggregator may exchange information with the home gateway 240 in association with implementation of various tunneling protocols, such as implement Layer Two Tunneling Protocol (L2TP), Soft-GRE, and VLAN, among others.

A request for a network address may be received (e.g., by the communication module 226) at block 306. For example, a user device may send a request to access a network to the home gateway. Upon receiving the request, the home gateway may establish a tunnel with the tunnel aggregator, and may send the request to the tunnel aggregator device. Upon receiving the request, the tunnel aggregator device may determine a network address for the user device (e.g., using DHCP) to enable the user device to be identified on the network, at block 308. The determined network address (e.g., IP address) may be sent to the user device (e.g., by the device identification module 228) at block 310.

Information that identifies the user device that requested network access may be stored in association with the determined network address at block 312. In this way, the device identification module 228 may store information exchanges associated with the user device in a table or other storage mechanism.

A request for a service, such as cloud-based service as described above, may be received at block 314. A determination may be made whether the user device and/or a user of the user device has access and/or permissions to the requested service, at block 316. The determination of whether the user device and/or user has access may be determined by the TAG 210 using the identity of the user device 270 from which the request is made. It will be appreciated that the TAG 210 may have user device and/or user identification information due to having a connection with the user device 270 via the Layer Two Tunnel 130, as established between the TAG 210 and the user devices 270 via the home gateway 240. If access is permitted at block 318, then at block 322, a link to the service may be established. This process may involve establishing an instance of the requested service, such as in the cloud, for the purposes of providing the service to the user device and/or user.

The establishment of the service(s) may consider a variety of factors and may be established by cooperation of a service function chain, in cooperation with a VCPE and/or the TAG 110. Upon establishing the service by the processes of block 322, the services may be provided to the requesting user device, and information associated with the provision of the service for the user device may be stored at block 324. The service may be provided via the Layer2Tunnel via the TAG 180. The cloud based server(s) that may provide the service(s), when communicating data packets associated with the service, the data packets may be encapsulated with LUA information at a VCPE and/or TAG 180 that individually addresses each of the user device(s) 120a-e at the home. In example embodiments, the home gateway 110 may provide pass-through function for the transmission of the data packets after establishment of the Layer 2 tunnel 130. If access is not permitted at block 318, then a message denying access to the requested service may be sent to the user device at block 326.

II. Administration and Location of Cloud-Based Services

Figure 4:
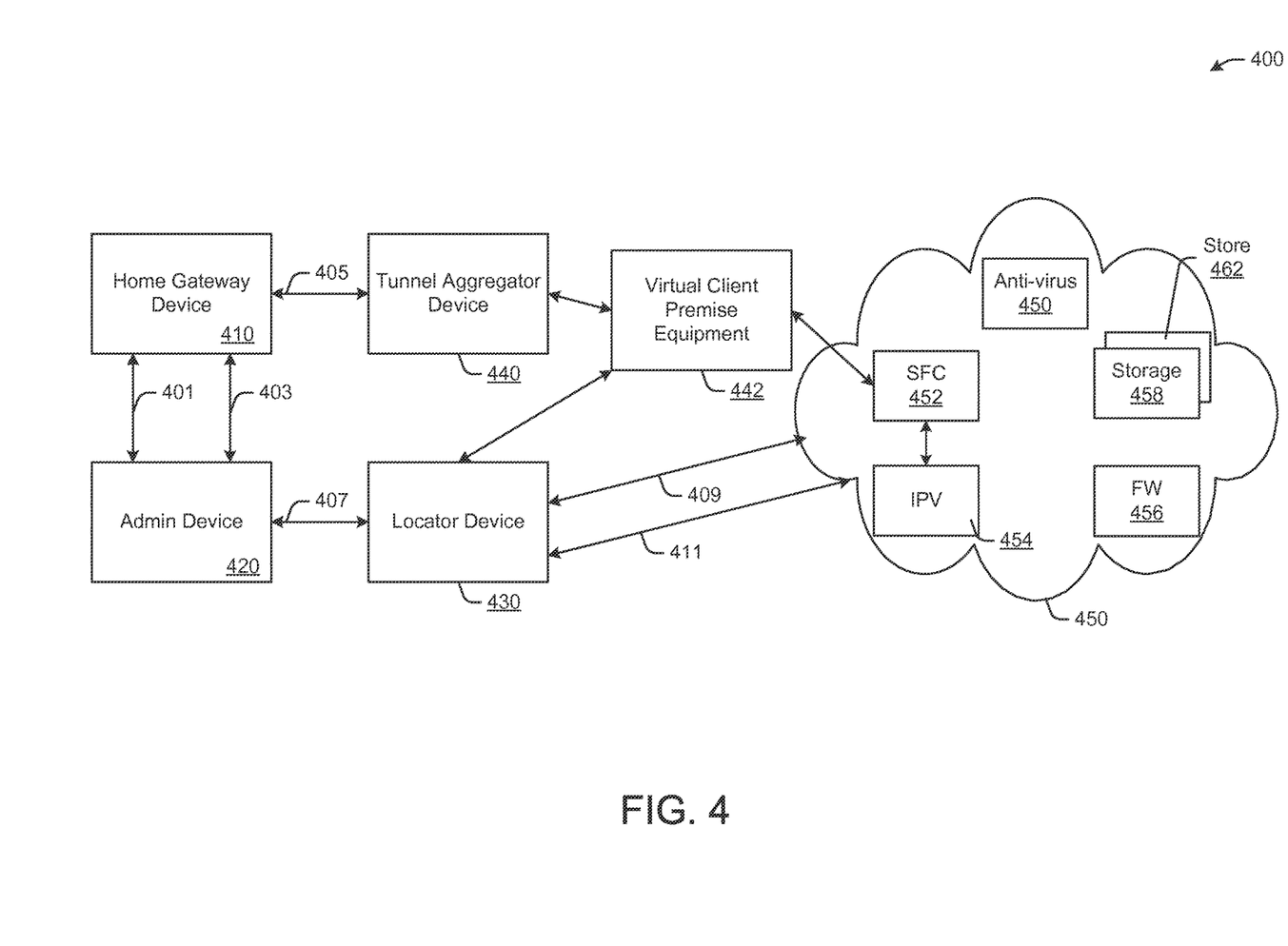
FIG. 4 illustrates a data diagram of an example environment for managing access to cloud-based services, according to an embodiment of the disclosure.

FIG. 4 depicts a data diagram of an example environment 400 for managing access to cloud-based services, according to an embodiment of the disclosure. The example process may be implemented or facilitated by a home gateway device 410, an administration device 420, a locator device 430, a tunnel aggregator device 440, and devices in the cloud 450 that may provide various services. Example services may include, but are not limited to, IP video 454 (e.g., streaming video), firewall services 456, storage 458, antivirus 460, other services related to phishing, spam, malware, etc., and a service function chain (SFC) 452 that may facilitate access to such services by the home gateway device 410 or user devices at the customer premise associated with the home gateway device 410. Although multiple devices providing particular functionality are shown in FIG. 4, any number of devices may be used in other embodiments. The functions performed by the devices in FIG. 4 may be performed by one or more software modules by a single device or multiple devices, such as devices in a cloud computing arrangement, in yet other embodiments. For example, in some example embodiments, there may be a virtual client premise device (VCPE) that cooperates with the TAG 440 and is intermediary between the TAG 440 and the SFC 452 to provide the various functions and/or services to the user device(s) 120a-e and/or the user(s).

The devices in FIG. 4 may facilitate location of services in the cloud 450. In some example embodiments, the home gateway device may send an initialization message to the administration device 420, as shown by line 401. The initialization message may include an identification of the home gateway device 410 and a request to access one or more services on behalf of a user device 120a-e associated with the home gateway device 410. Upon receiving the initialization message, the administration device 420 may send a request 403 to the home gateway device 410 to create a tunnel. The home gateway device 410 may create a tunnel 405 to the tunnel aggregator device 440. The tunnel 405 may be created using various tunneling protocols as described above.

The administration device 420 may send a message to the locator device 430, as shown by line 407. The message may include an indication that the home gateway device 410 is online and is establishing, or has established, a tunnel 405 with the tunnel aggregator device 440 to exchange information regarding services in the cloud 450. The locator 430 may, upon receiving the message 430, send an instruction 409 to one or more devices in the cloud 450 to establish services for the home gateway device 410. Such services may be those services previously purchased or subscribed to by a user of the home gateway device 410, or otherwise services that the user has rights or privileges to access. In this way, services for customers may be dynamically generated such that customers may have their own personal cloud that includes services related to them.

The locator device 430 may know the location of services requested by the home gateway device 410. The location of such services (e.g., servers that may be providing the services), among other information, may be provided to the locator device 430, as shown by line 411. The locator device 430 may store the information and use to locate services requested by the home gateway device 410. As instances of services running in the cloud 450 are added, for example, the location of the new services may be communicated to the locator device 430, where the location may be stored. The locator device 430 may direct requests for services to the new instances by determining the location based at least in part on the stored information. For example, when a home gateway device 410 receives a request from a user device to access storage or other services, the locator device 430 may direct the home gateway device 410, via the Administrator device 420, to the location of an existing or a new instance (e.g., a new storage instance 462) associated with the service. In this way, as existing services are moved to different locations within a cloud or to another cloud or network, or as new instances of services are created in various locations within one or more clouds or networks, such services may be dynamically located by the locator device 430, which may direct the home gateway device 410 to the particular location of the service in the cloud 450 or other location at which the service may reside.

III. Dynamic Creation and Relocation of Cloud-Based Services

Figure 5:
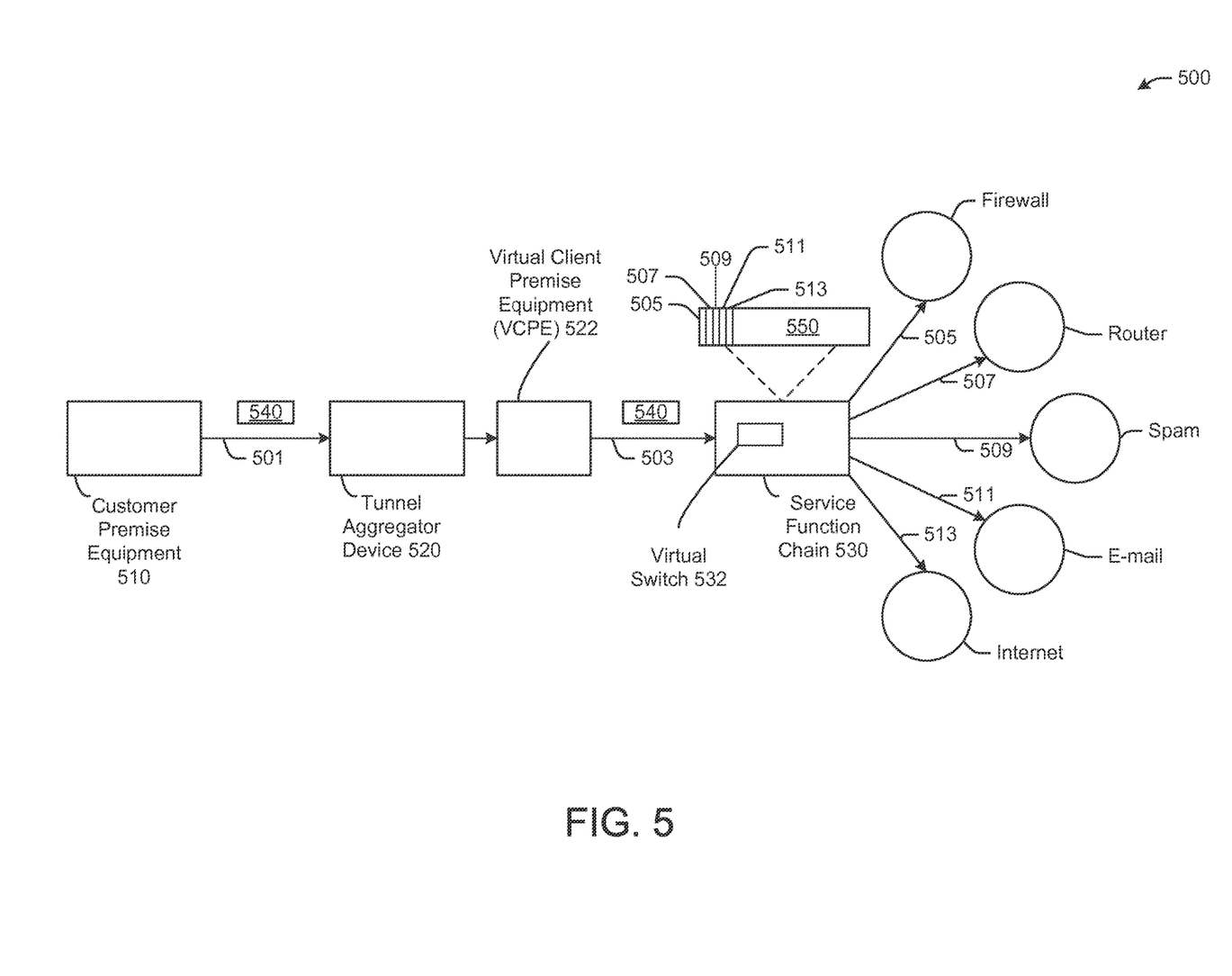
FIG. 5 illustrates a block diagram of an example environment for routing data packets through one or more networks using a service function chain, according to an embodiment of the disclosure.

FIG. 5 depicts a block diagram of an example process for routing data packets through one or more networks using a service function chain, according to an embodiment of the disclosure. As shown, the SFC 530, with a virtual switch incorporated therein, may receive a data packet 540 from a virtual client premise equipment (VCPE) 522, modify header information associated with the data packet 540 to generate the data packet 550, and route the data packet 550 to various destinations. In one embodiment, the header of the data packet 550 may be modified to include, among other information, addresses of the destination to which the data packet 550 may be routed. In one example, the data packet 550 may be modified to include a header 505 that corresponds to a destination 505 associated with a firewall, a header 507 that corresponds to a destination 507 associated with a router, a header 509 that corresponds to a spam filter or service 509, a data packet 511 that corresponds to an e-mail service, and a header 513 that corresponds to the Internet 513. Any number and/or type of services may exist in other examples. After the service function chain 530 sends the data packet 550 to a destination, it may remove the header associated with the destination from the data packet 550. In this way, the service function chain 530 may control distribution of the data packet 540 to one or more devices or services in a cloud computing arrangement. In some example embodiments, the SFC 530 may enable communications with and/or among the various services. This may enable optimization of the location of the instances of the services that are provided to particular user devices 120*a-e* via the SFC 530, VCPE 522, and/or TAG 520.

In example embodiments, the TAG device 520 may functionally cooperate with the virtual client premise equipment (VCPE) 522. The VCPE 522 may indicate services to which the subscriber, for whom the Layer Two Tunnel has been established, may have subscribed and/or purchased, or is otherwise entitled. The indications of these services may be added and/or encapsulated onto the communications that are provided to a virtual router and/or virtual switch 532 of the SFC 530, for the purposes of adjudicating and/or setting up services for the subscriber and/or home equipment. It will be appreciated that in some example embodiments, the VCPE 522 may be part of a cloud implementation. In other example embodiments, the VCPE 522 may be separate from the cloud, and between the cloud based services and the TAG 520. The VCPE 522, in some example embodiments, may be integrated with the TAG 520. In other example embodiments, the VCPE 522 and the TAG 520 may be independent entities that cooperate to provide a pathway from the customer premise 510 to cloud services, as managed by the SFC 530. The VCPE 522, in its role for facilitating SFC-based services via the Layer Two Tunnel, may provide services such as DHCP, AAA, or other forms of authentication, DNS, NAT, LUA-to-GUA operability, combinations thereof, or the like.

As mentioned above, various metrics and techniques may be used to determine where to locate cloud services. An example technique may be based on service level agreements (SLAs). Any variety of suitable heuristics, statistical analysis, and/or other analysis may be used to determine how to allocate various services (e.g., value added offerings to customers) to available assets (e.g., available servers and other processing units). For example, if jitter or packet loss is measured and deemed beyond a respective predetermined threshold level, then the asset (e.g., server) from where that service is provided (e.g., service location) for that particular user device 270 may be changed. Any such changes may then be registered with the locator device 430 and/or the administrator device 420. In example embodiments, the SFC 530 may be utilized in requesting the service from the appropriate entities.

The processes involved in providing user and/or user device specific services may include, in example embodiments, a home gateway coming online and request DHCP service. This DHCP request may be received by a an edge access device and provided to a server, such as an edge access server. The edge access server may then instruct the home gateway to establish a Layer Two Tunnel to the TAG, such as by providing the address and/or location of the TAG device. The home gateway and the TAG may establish a Layer Two Tunnel, responsive to a request for a Layer Two Tunnel received by the TAG from the home gateway. Next, individual device(s) at the customer premise may perform a DHCP process with the VCPE via the Layer Two Tunnel. This process may involve the user device transmitting a DHCP request via the home gateway and the TAG to the VCPE and the VCPE assigning a LUA to the user device. Next, the user device may request a service. The request may be received by the VCPE and provided by the VCPE to the locator device which may then provide the user device access to the various services via the SFC. The locator device, such as in cooperation with the administration device, may verify services to which the user and/or the user device is entitled. Upon verifying services for the user device, the SFC may provide routing of the requested service to the user device, such as through the Layer Two Tunnel.

Various block and/or flow diagrams of systems, methods, apparatus, and/or computer program products according to example embodiments of the invention are described above. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

The computer-executable program instructions may be loaded onto a special purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special purpose, hardware-based computer systems that perform the specified functions, elements or steps, or combinations of special purpose hardware and computer instructions.

Many modifications and other embodiments of the invention set forth herein will be apparent having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A tunnel aggregator device, comprising:
   at least one memory for storing computer-executable instructions; and
   one or more processors configured to access the at least one memory and execute the computer-executable instructions to:
   receive, by the tunnel aggregator device (TAG), a first request from a home gateway device at a customer premise to establish a layer two tunnel with the home gateway device at the customer premise;
   establish the layer two tunnel with the home gateway device at the customer premise based at least in part on the first request;
   receive, by the TAG, from the home gateway device at the customer premise and via the layer two tunnel, a second request for a locally unique address (LUA), wherein the second request comprises an indication of a layer two identity of a user device at the customer premise;
   determine the LUA for the user device based at least in part on the indication of the layer two identity of the user device at the customer premise;
   send, via the layer two tunnel, the LUA to the user device;
   store an indication of association of the user device to the LUA;
   receive, by the TAG, via the layer two tunnel, a third request for a service, wherein the third request comprises the LUA; and
   authenticate the third request for the service based at least in part on the LUA and the indication of association of the user device to the LUA.

2. The tunnel aggregator device of claim 1, wherein to establish the layer two tunnel with the home gateway device at the customer premise based at least in part on the first request comprises using a protocol comprising at least one of: (i) Layer Two Tunneling Protocol (L2TP), (ii) Soft-Generic Routing Encapsulation (soft-GRE), (iii) Virtual Local Area Network (VLAN), or (iv) Virtual Extended Local Area Network (VXLAN).

3. The tunnel aggregator device of claim 1, wherein to receive the second request for the LUA comprises the one or more processors further configured to:
   de-encapsulate the second request; and
   identify a Media Access Control (MAC) address associated with the user device.

4. The tunnel aggregator device of claim 1, wherein the one or more processors further configured to:
   receive, by the TAG, a fourth request, from a second user device and via the layer two tunnel, for a second LUA;
   determine the second LUA for the second user device;
   send, via the layer two tunnel, the second LUA to the second user device; and
   store a second indication of association of the second user device to the second LUA.

5. The tunnel aggregator device of claim 1, wherein the one or more processors is further configured to
   initiate delivery of the service to the user device.

6. The tunnel aggregator device of claim 5, wherein to authenticate the third request for the service based at least in part on the LUA and the indication of association of the user device to the LUA comprises the one or more processors further configured to access a table associating the LUA with a list of services available to the user device.

7. The tunnel aggregator device of claim 5, wherein the service is at least one of: (i) anti-virus protection; (ii) cloud storage; (iii) cloud processing; (iv) content delivery; (v) location-based services; (vi) firewall; or (vii) communications services.

8. A method, comprising:
   receiving, by a tunnel aggregator device (TAG) comprising one or more processors, a first request from a home gateway device at a customer premise to establish a layer two tunnel with the home gateway device at the customer premise;
   establishing, by the TAG, the layer two tunnel with the home gateway device at the customer premise based at least in part on the first request;
   receiving, by the TAG from the home gateway device at the customer premise via the layer two tunnel, a second request for a locally unique address (LUA), wherein the second request comprises an indication of a layer two identity of a user device at the customer premise;
   determining, by the TAG, the LUA for the user device based at least in part on the indication of the layer two identity of the user device at the customer premise;
   sending, by the TAG via the layer two tunnel, the LUA to the user device;
   storing, by the TAG, an indication of association of the user device to the LUA;
   receiving, by the TAG via the layer two tunnel, a third request for a service, wherein the third request comprises the LUA; and authenticating, by the TAG, the third request for the service based at least in part on the LUA and the indication of association of the user device to the LUA.

9. The method of claim 8, wherein establishing the layer two tunnel with the home gateway device at the customer premise based at least in part on the first request comprises using a protocol comprising at least one of: (i) Layer Two Tunneling Protocol (L2TP), (ii) Soft-Generic Routing Encapsulation (soft-GRE), (iii) Virtual Local Area Network (VLAN), or (iv) Virtual Extended Local Area Network (VXLAN).

10. The method of claim 8, wherein receiving the second request for the LUA comprises:
de-encapsulating the second request; and
identifying a Media Access Control (MAC) address associated with the user device.

11. The method of claim 8, wherein the method further comprises:
receiving, by the TAG, a fourth request, from a second user device and via the layer two tunnel, for a second LUA;
determining, by the TAG, the second LUA for the second user device;
sending, by the TAG via the layer two tunnel, the second LUA to the second user device; and
storing, by the TAG, a second indication of association of the second user device to the second LUA.

12. The method of claim 8, further comprising:
initiating delivery of the service to the user device.

13. The method of claim 12, wherein authenticating the third request for the service based at least in part on the LUA and the indication of association of the user device to the LUA further comprises:
accessing a table associating the LUA with a list of services available to the user device.

14. The method of claim 12, wherein the service is at least one of: (i) anti-virus protection; (ii) cloud storage; (iii) cloud processing; (iv) content delivery; (v) location-based services; (vi) firewall; or (vii) communications services.

15. One or more non-transitory machine-accessible media having stored thereon instructions that, when executed by one or more machines, cause the one or more machines to perform the operations comprising:
receiving a first request from a home gateway device at a customer premise to establish a layer two tunnel with the home gateway device at the customer premise;
establishing the layer two tunnel with the home gateway at the customer premise based at least in part on the first request;
receiving, from the home gateway device at the customer premise and via the layer two tunnel, a second request for a locally unique address (LUA), wherein the second request comprise an indication of a layer two identity of a user device at the customer premise;
determining the LUA for the user device based at least in part on the indication of the layer two identity;
sending, via the layer two tunnel, the LUA to the user device;
storing an indication of association of the user device to the LUA;
receiving, via the layer two tunnel, a third request for a service, wherein the third request comprises the LUA; and
authenticating the third request for the service based at least in part on the LUA and the indication of association of the user device to the LUA.

16. The one or more non-transitory machine-accessible media of claim 15, wherein receiving the second request for the LUA comprises:
de-encapsulating the second request; and
identifying a Media Access Control (MAC) address associated with the user device.

17. The one or more non-transitory machine-accessible media of claim 15, wherein the operations further comprise:
receiving a fourth request, from a second user device and via the layer two tunnel, for a second LUA;
determining the second LUA for the second user device;
sending, via the layer two tunnel, the second LUA to the second user device; and
storing a second indication of association of the second user device to the second LUA.

\* \* \* \* \*